J. H. YOUNG.
SHOCK ABSORBER.
APPLICATION FILED JUNE 20, 1917.

1,254,106.

Patented Jan. 22, 1918.

J. H. Young, Inventor by C. A. Snow & Co., Attorneys

Witnesses

UNITED STATES PATENT OFFICE.

JOHN H. YOUNG, OF BARTLESVILLE, OKLAHOMA.

SHOCK-ABSORBER.

1,254,106.　　　　　　Specification of Letters Patent.　　Patented Jan. 22, 1918.

Application filed June 20, 1917.　Serial No. 175,846.

*To all whom it may concern:*

Be it known that I, JOHN H. YOUNG, a citizen of the United States, residing at Bartlesville, in the county of Washington and State of Oklahoma, have invented a new and useful Shock-Absorber, of which the following is a specification.

The subject of this invention is a shock absorber intended for use on vehicles to prevent shocks due to violent vibrations of the vehicle body.

The main object of the invention is to provide a shock absorber which may be attached to the running gear and chassis of a vehicle to prevent excessive relative motion of the parts.

Another object is to provide pneumatic cushioning means for retarding the motion of the parts.

Another object is to provide a shock absorber which will permit sufficient range and ease of motion while, at the same time, checking the movement.

Still another object is to provide a simple and efficient shock absorber.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

A practical embodiment of the invention is shown in the accompanying drawing wherein.

Figure 1:
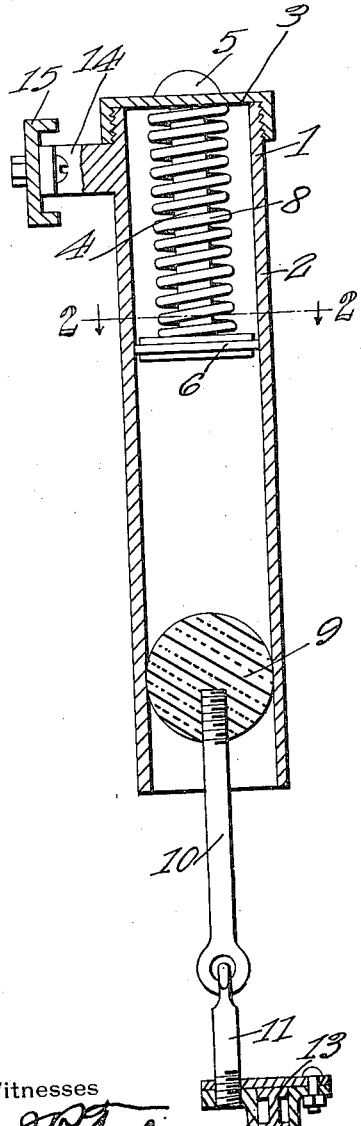
Figure 1 is a longitudinal section of the device indicated as attached to the chassis and axle of a vehicle.
Figure 2:
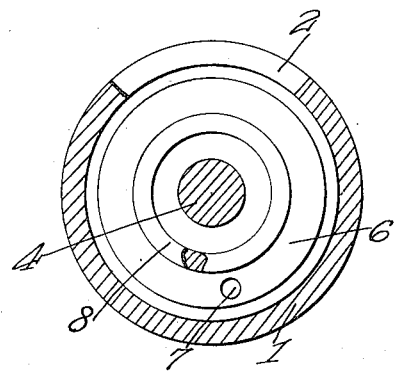
Fig. 2 is a cross section on the line 2—2 of Fig. 1.
Figure 3:
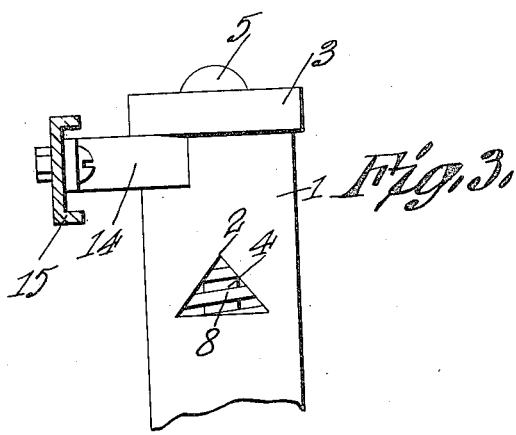
Fig. 3 is a broken detail showing the upper end of the device in side elevation.

Referring to the drawing by numerals of reference,

A cylinder is indicated by 1 which is preferably provided with an opening 2 situated at a median point in its wall and near the head end. The head end of the cylinder is closed by a screw cap 3, or otherwise, and the cap is centrally apertured to receive a valve stem 4 which reciprocates within the aperture and is limited in its inward movement by a head 5 which is formed by upsetting the end of the stem or otherwise. To the inner end of the stem 4 is secured a valve 6 which is provided with a small opening or port 7. A coiled spring 8 surrounds the stem 4 and is confined between the valve 6 and the head 3.

Sliding in the cylinder 1 is a globular piston 9 which is provided with a piston rod 10. The piston rod 10 has its free end apertured to receive the hook of a hook bolt 11 to form a yielding connection between these parts.

The hook bolt 11 is threaded into a bracket or yoke 12 which may be clamped about the axle 13 of a vehicle. At a point on the wall of the cylinder near its head end an outwardly projecting lug or bracket 14 may be formed for the purpose of connecting the cylinder to a bar 15 of the chassis of the vehicle.

In practice the device operates as follows: When vibration is imparted to the vehicle body, as the body approaches the running gear, the piston 9 will be forced upwardly into the cylinder 1 first compressing air between the piston and the valve 6. When this compression has become sufficient to lift the valve air will escape through the opening 2 and permit comparatively free motion of the piston.

On rebound the piston 9 will be drawn downwardly allowing the valve to assume its normal position under the action of the spring 8, which will admit air to the cylinder below the valve only through the small opening 7, thus considerably retarding the vibration.

Having thus described the invention, what is claimed as new and sought by Letters-Patent, is:—

A shock absorber, comprising a cylinder provided with an aperture in its head end, a resiliently held valve in the cylinder having a stem reciprocating through the aperture, said valve provided with an opening and said cylinder having an air port between the head end and the normal position of the valve, a globular piston reciprocating in the cylinder below the valve, a piston rod carried by the piston, means for pivotally connecting the piston rod to the running gear of a vehicle, and means for connecting the cylinder to the body of a vehicle.

In testimony that I claim the foregoing as my own, I have hereto affixed my signature in the presence of two witnesses.

JOHN H. YOUNG.

Witnesses:
  NEOLIN CAMPBELL,
  TOM GEORGE.